Patented Nov. 10, 1936

2,060,572

UNITED STATES PATENT OFFICE 2,060,572

BEER LACQUER

Adolf Heck, Kansas City, Mo., assignor to Cook Paint & Varnish Company, Kansas City, Mo., a corporation of Delaware No Drawing. Application May 6, 1935, Serial No. 20,097

4 Claims. (Cl. 91—70)

This invention relates to beer lacquers; and it comprises as a new manufacture a steel or iron can provided with a cohering interior poreless, tasteless, film of a vinyl resin containing a minimal amount of phosphoric acid, an amount equal to 0.1 per cent of the film calculated as sirupy phosphoric acid or .07 per cent calculated as $P_2O_5$; and it comprises a method of making such an article wherein a commercial partially resinified vinyl preparation soluble in ketones is dissolved in a volatile vehicle, the stated amount of phosphoric acid is added, the lacquer composition is sprayed on the interior of cans, and is baked in place for approximately 15 minutes at approximately 350° F.; all as more fully hereinafter set forth and as claimed.

The problem of packaging beer in ordinary "tin" cans has not been solved. No tin coating is ever flawless enough to prevent access of beer to the underlying iron nor is tin itself absolutely without influence on the taste of beer. While the ordinary tin coating for iron is ample protection in canning most articles of food, it is not as regards beer.

Variously highly reactive vinyl compounds are known, among them vinyl chlorid and vinyl acetate. These readily polymerize to form resins, resinification being in stages. The product of the final stage is, or may be, a hard, clear colorless material insoluble in most liquids. In intermediate stages resins are produced which are still soluble in the ketonic solvents. These "half polymerized" or "partially polymerized" vinyl compounds are commercially available and form useful varnish bases. On solution in a suitable varnish vehicle they give varnishes that can be applied to surfaces in the ordinary way, drying down to clear coating films. In time, and more quickly on heating, resinification is advanced in stages with production of the stated insoluble end products.

Polymerization is often aided by a catalyst which is sometimes benzoyl peroxid and the first stages are often performed in acetone solution, the acetone being evaporated to recover resins in the soluble stage; the commercial products referred to. The products formed from vinyl chlorid and from vinyl acetate are somewhat different and mixtures of the two are often used. A mixture of vinyl chlorid and vinyl acetate in a ratio around 85:15 gives particularly good resins.

Unfortunately these vinyl resins while very good for many other purposes do not cohere well to naked metal; the varnishes are unsatisfactory for direct application to metal. The varnishes can not be satisfactorily used for lining metal cans intended to contain beer or delicate food articles.

I have, however, found that if the varnish contains a minimal amount of phosphoric acid, a film produced by spraying on iron and drying coheres firmly. Absolutely poreless, tasteless, permanent films resisting flexure can be made by baking such a film containing phosphoric acid for about 15 minutes at 350° F. A steel or iron can, tinned or not, provided with a film of this baked-on lacquer is wholly resistant to the action of beer and of foods; there is no access of the beer to the underlying metal. Unlike a tin coating, there are no flaws. There is an absolute bond between the film and the underlying metal. Beer packaged in a lined can of this type can be stored indefinitely without deterioration due to the action of metal on the beer.

In practical embodiments of the present invention, I take reactive vinyl preparations and polymerize them to a degree where a ketone soluble resin results; or use the commercial semi-polymerized vinyl products; the commercial soluble forms of resin. The semi-polymerized material resulting from a mixture of vinyl chlorid and vinyl acetate, I find particularly good. The soluble resin I dissolve in a suitable varnish vehicle. One of a generally ketonic nature but containing a small proportion of volatile hydrocarbon is best. The presence of the volatile hydrocarbon aids in forming good film.

Whatever the vehicle, I add to it a little phosphoric acid. Good results are obtained by the addition of 0.1 per cent commercial sirupy phosphoric acid based on dry film. This corresponds to about .07 per cent actual $P_2O_5$. This amount is insufficient to have any harmful effect on beer or delicate foods.

A particular varnish giving good results was made containing 15.2 per cent partially resinified vinyl compounds, 12.16 per cent methyl ethyl ketone, the same amount of hexone, 6.08 butyrone and about 31 per cent of a mixture of toluol and coal tar solvent naphtha in a 4:1 ratio. Into this mixture I stirred in a tenth per cent of commercial sirupy phosphoric acid calculated on the dry material. This varnish was directly sprayed on the interior of black iron cans which were then baked for 15 minutes.

In the particular work just noted, the cans were made of pickled and cleaned hot steel formed into cans and then varnished as described. The results are quite the same in using cans made of tinned metal. In using black iron it is often desirable to size the flat metal preliminarily to making cans using a thin layer of a China-wood oil baking varnish and baking.

The described lacquer without the addition of the phosphoric acid does not give good results. But a varnish containing a vinyl resin dissolved in a volatile vehicle with an addition of a trace of phosphoric acid does give good coating coats. The best results are secured when the vehicle is, like that of the example given ante, of generally ketonic nature but contains a substantial proportion of volatile hydrocarbons.

What I claim is:—

1. The process of providing metal cans with a tightly inherent, poreless, impervious, tasteless, lining film withstanding the action of beer and delicate foods without injury thereto which comprises dissolving a trace of phosphoric acid in a vinyl resin varnish, applying the varnish to the interior of the can as a thin film, drying and baking to complete the resinification, the proportion of phosphoric acid used being sufficient to give a varnish having firm adherence to the can but insufficient to cause contamination of beer and delicate foods.

2. The process of claim 1 wherein the amount of phosphoric acid is about .07 per cent $P_2O_5$ calculated on the vinyl resin.

3. The process of claim 1 wherein the baking is to a temperature of about 350° F. for a time of about 15 minutes.

4. As a new article a metal can provided with a cohering interior poreless, tasteless, insoluble continuous film of a vinyl resin containing a trace of free phosphoric acid; said film having been baked to complete resinification, the proportion of phosphoric acid being sufficient to give a varnish having firm adherence to the can but insufficient to cause contamination of beer and delicate foods.

ADOLF HECK.